(12) United States Patent
Bhatnagar et al.

(10) Patent No.: US 6,765,659 B1
(45) Date of Patent: Jul. 20, 2004

(54) OPTICAL SUPERVISORY CHANNEL APPARATUS AND METHOD FOR MEASURING OPTICAL PROPERTIES

(75) Inventors: Vipul Bhatnagar, Kensington, MD (US); Balakrishnan Sridhar, Ellicott City, MD (US); Michael Y. Frankel, Baltimore, MD (US); Prasad Dasika, Odenton, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 10/231,915

(22) Filed: Aug. 30, 2002

(51) Int. Cl.[7] ............................................. G01N 21/00
(52) U.S. Cl. ...................................................... 356/73.1
(58) Field of Search ..................... 356/73.1; 398/9–38; 370/230–252, 276–295, 320–400; 375/133–136; 250/216, 226, 227.18–227.23

(56) References Cited

U.S. PATENT DOCUMENTS 5,831,982 A * 11/1998 Hummel ..................... 370/396
6,480,497 B1 * 11/2002 Flammer et al. ............ 370/400
6,657,186 B2 * 12/2003 Graves .................. 250/227.23

* cited by examiner

Primary Examiner—Tu T. Nguyen
(74) Attorney, Agent, or Firm—Michael R. Cammarata

(57) ABSTRACT

A service channel modem is adapted to determine optical properties of an optical fiber link connecting two nodes. The optical service channel (OSC) communicates an optical reference parameter over the fiber link. An optical parameter of the OSC transmitted over the fiber link is measured. By recovering the optical reference parameter from the OSC and using the measured optical parameter, certain optical properties may be determined including link loss, multi-path interference, and chromatic dispersion. When measuring chromatic dispersion, one of the fiber links serves as a synchronization reference and the other is the link being measured.

21 Claims, 14 Drawing Sheets

OPTICAL SUPERVISORY CHANNEL APPARATUS AND METHOD FOR MEASURING OPTICAL PROPERTIES

BACKGROUND OF THE INVENTION

1. Field of Invention

The invention generally relates to measuring, in situ, optical parameters using an optical supervisory channel. More particularly, the invention relates to adapting conventional service channel modems, or other devices handling an optical supervisory channel, to measure optical parameters such as chromatic dispersion, link loss, and multi-path interference.

2. Description of Related Art

Fiber-optic communication networks are experiencing rapidly increasing deployment. Especially rapid is the growth of segments that carry multi-gigabit digital data on multiple wavelengths over a single fiber strand. There are two major areas that have seen substantial increases in performance.

The first area is the rapidly increasing bit-rate of a single communication channel. While several years ago 622 Mbps and 2.5 Gbps rates were dominant, current networks are being deployed with 10 GBps data rates, and new network plans using 40 Gbps data rates are being proposed. When modulated onto an optical carrier, the optical spectrum is broadened in linear proportion to the bit-rate. The interaction of the broadened optical spectrum with wavelength-dependant group velocity (chromatic dispersion) in the fiber introduces signal distortions.

The amount of tolerable distortion is inversely proportional to the bit-rate. Thus, the combination of increasing spectral broadening and decreasing distortion tolerance makes the overall propagation penalty proportional to the square of bit-rate. For example, this results in a 10 Gbps signal being 16 times less tolerant to dispersion than 2.5 Gbps signal, while having only 4 times the bit-rate. Dispersion accumulates linearly with propagation distance in the fiber, and typical dispersion-limited propagation distances in standard single-mode fiber (SMF-28 or equivalent) are ~1000 km at 2.5 Gbps, 60 km at 10 Gbps, and only ~4 km at 40 Gbps. Clearly, accurate dispersion measurement is critical for high data rate fiber-optic system deployment. The above linear effect is only sensitive to the total amount of dispersion between the transmitter and receiver.

Second, optical signals experience certain nonlinear interactions when propagating along the optical fiber. These effects, such as self-phase modulation, cross-phase modulation, four-wave mixing, etc also depend on the chromatic dispersion in the optical fiber. In contrast to the linear effects, the nonlinear effects are sensitive to the actual distribution of dispersion values along the optical fiber link (not just total dispersion).

As metropolitan fiber optic networks increase in capacity, they also tend to shift to carrying signals with ever increasing data rates. Further, metropolitan networks tend to have architectures with multiple optical signal add/drop points along the same path. Thus, the specific routes taken by the different WDM signals are varied which leads to variations in the link loss, multi-path interference (MPI) and chromatic dispersion experienced by the different WDM signals as they traverse diverse paths. Thus, accurate measurement of optical properties such as link loss, MPI and chromatic dispersion is important particularly measurements for each fiber-optic segment (optical link) between the add/drop points.

Several methods exist for dealing with dispersion measurements. One relies on using a stand-alone dispersion measurement test-set to measure each fiber-optic link before optical data signals are connected to it. Besides requiring a separate instrument, this makes real-time measurements on an installed system impossible. After the system is installed a new measurement cannot be made. Thus, if the original measurement data is lost or inaccurate the system performance will suffer and cannot be corrected.

Another conventional dispersion measuring method relies on utilizing a subcarrier signal that is carried along with the WDM channels between the data transmitter and receiver. This method assumes that such signals are available between all the points that need to be measured, which is not true in most cases. Further, it assumes that the system is fully functional and able to carry data which is also not true in a case of a new installation.

Another problem that is potentially damaging to fiber-optic communication systems is multi-path interference. This problem arises where there are two or more optical reflections along the optical fiber link. Signals arising at these reflections have a delayed arrival time at the receiver with respect to the main signal, giving rise to interferometric noise and additional performance penalties.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not necessarily require a direct physical connection.

The term "service channel" as used herein refers to a wavelength of an optical communication system such as a WDM, SONET or SDH-based system that is used to carry operational, administrative, maintenance, and/or provisioning information and is synonymous with "optical supervisory channel", "OSC", "optical service channel" or other industry terms that refer to these functions. A service channel may be "in-band" meaning that the service channel wavelength lies within the data wavelength transmission window of a WDM system (e.g., within the range of around 1500 nm–1590 nm). A service channel may also be "out-of-band" meaning that the service channel wavelength is outside the wavelength transmission window of the WDM system.

Typically, the service channel signal is carried on a wavelength separate from those of the data signals (out-of-band). Nonlimiting examples of service channel wavelengths include 1310 nm, 1510 nm and 1625 nm in typical modern fiber-optic communication systems.

The term "service channel modem" as used herein refers to any device capable of handling the transmission and receipt of a service channel. More specifically, service channel modems handle a service channel that is optically multiplexed onto the same fiber as the WDM data signals, using wavelength-multiplexing filters or equivalent. After propagating through an optical fiber link, the service channel signal is optically demultiplexed from the data signals using wavelength-selective filters or equivalent and detected by an optical receiver in the downstream service channel modem. A new service channel signal is optically multiplexed for transmission along the next fiber-optic link to the subsequent (downstream) node.

Figure 1:
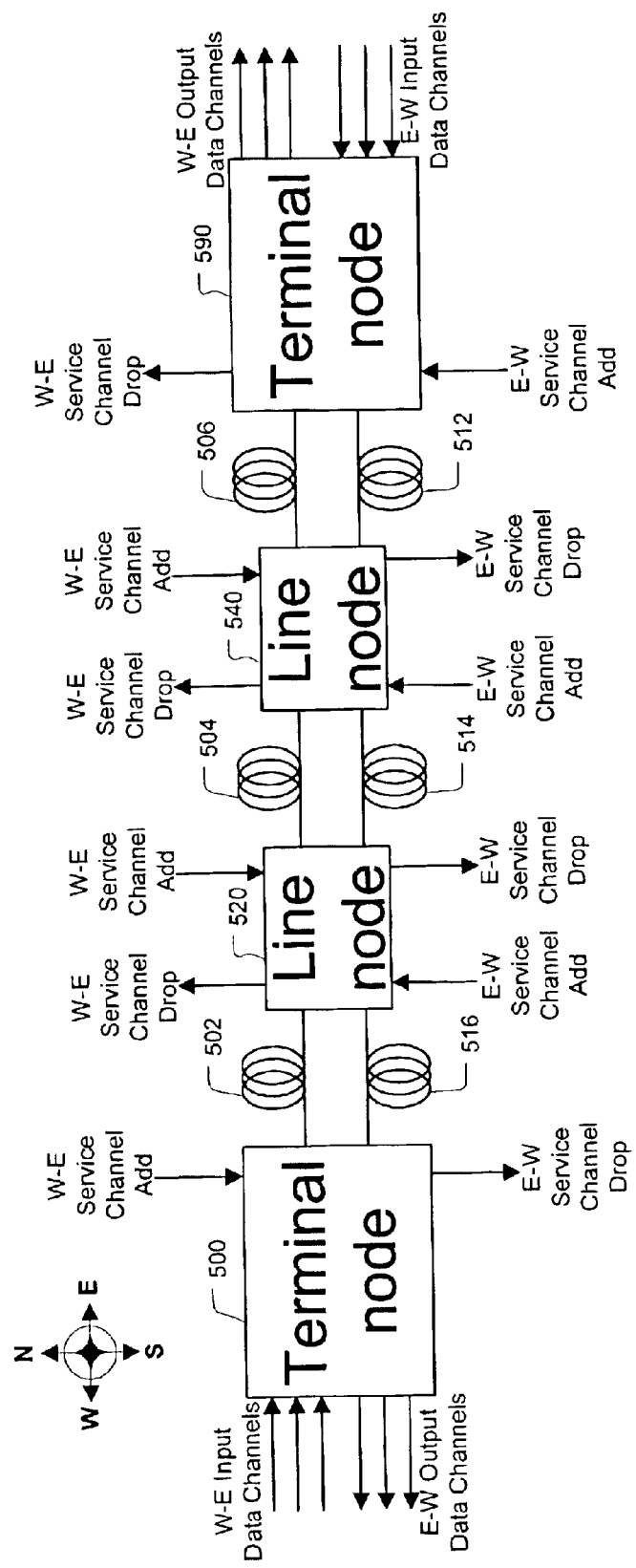
FIG. 1 is a high-level block diagram of a conventional wavelength division multiplexed (WDM) system illustrating the dropping and adding of Eastbound (W-E) and Westbound (E-W) service channels at each node.

FIG. 1 illustrates a typical and conventional WDM system architecture having both an East-West (E-W) and West-East (W-E) optical signal pathways. Terminal nodes 500, 590 serve as the origination and termination points for these optical signal pathways. More specifically, W-E input data channels are input to terminal node 500 and output as an optical signal for Eastbound optical communication. This signal generation is quite conventional and typically involves modulating a transmitting laser, either directly or indirectly, according to the electrical input data. Because this is a WDM system, multiple such channels are generated and optically multiplexed onto optical fiber link 502 for transmission to line node 520. Optical transmission continues from line node 520 to link 504, to line node 540, to link 506, and then to terminal node 590 which typically performs an O/E (optical-to-electrical) conversion to produce the W–E output data channels as shown in FIG. 1. Similarly, the Westbound (E-W) transmission runs from terminal node 590, to link 512, to line node 540, to link 514, to line node 520, to link 516, and then to terminal node 500.

Line nodes 520, 540 may take a variety of forms and perform a multitude of functions. Most typically, a line node is an optical line amplifier (OLA) that amplifies the WDM signal or an optical add-drop multiplexer (OADM) capable of dropping and/or adding one or more channels of the WDM signal. A common way to construct an OLA is with an erbium doped fiber amplifier (EDFA) and various examples exist for constructing OADMs neither of which are dispositive here.

It should be noted that in certain systems, such as ones designed for metropolitan networks having a ring-based topology, there may not be a terminal node. In such systems, only line nodes may exist and channels may be introduced and extracted (added and dropped) via OADMs.

The structure and arrangement of the WDM system shown in FIG. 1 is for illustration purposes only and provides a context in which the invention may operate. Many variations in this context are possible including, for example, ring-based topologies where the directional sense is typically clockwise and counter-clockwise rather than East and West. It is also to be understood that the directional indicators on the various figures are for ease of reference and convenience only and that the actual, physical orientation of the system may be quite different from East-West.

The present invention may be efficiently implemented by modifying existing fiber-optic optical supervisory channel components to carry out a new measurement functionalities such as link loss, dispersion measurement and MPI. Low data rate service channel modems are typically deployed at each node of a fiber-optic system. These modems carry information on the general state of the system, and provide a path for system configuration and monitoring.

The present invention can provide information on the multi-path interference problems along the fiber-optic communication link that are difficult to obtain otherwise.

The service channel pathways are a significant feature of the conventional WDM system of FIG. 1 that is utilized to advantage by the invention. As shown therein, the Eastbound service channel (W-E) is added at terminal node 500, travels via optical link 402 to the next node (line node 520) where it is dropped. At line node 520 the Eastbound service channel is added again to the WDM signal and then travels across optical link 504 to line node 540 which, in turn, first drops then adds the service channel for transmission to terminal node 590 via link 506. In general, each line node and terminal node of the WDM system both drops and adds the service channel. Thus, the service channel is accessible at each line node and terminal node and traverses the optical links interconnecting the nodes. The invention exploits this accessibility and optical link traversal to advantage as further explained below in detail.

Figure 2:
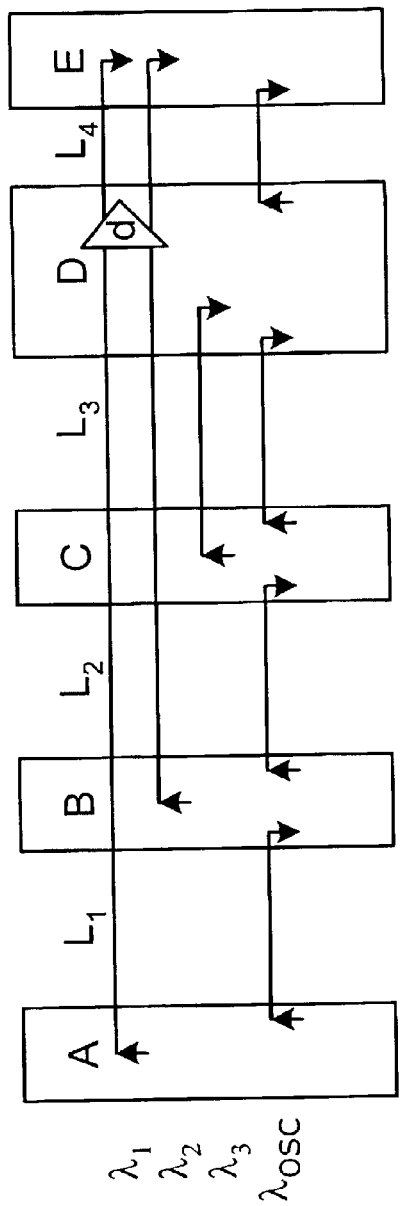
FIG. 2 is a high-level block diagram of a conventional WDM system illustrating the optical paths taken by various wavelengths including data wavelengths and the optical supervisory channel (OSC) wavelength.

Consider the optical network shown in FIG. 2 illustrating typical optical paths taken by various wavelengths of a WDM optical system. Wavelengths $\lambda_1$, $\lambda_2$ and $\lambda_3$ are respectively added to the transmission path at nodes A, B and C, and respectively dropped at nodes E, E and D. Furthermore, an optical communication link exists between adjacent nodes via an optical supervisory channel ($\lambda_{osc}$) operating at a known, fixed wavelength. The optical transmission losses (link losses) between nodes A and B, B and C, C and D, and D and E are illustrated as L1, L2, L3 and L4, respectively. Although each wavelength's path is shown as being spatially separate in the figure for clarity, the different wavelengths are, in fact, wave-division multiplexed so that a single optical fiber is connected between each of the nodes A, B, C, D and E. For example, wavelengths $\lambda_1$, $\lambda_2$ and $\lambda_3$, and ($\lambda_{osc}$) all travel on the same optical fiber linking nodes C and D.

If the transmission losses are such that wavelengths $\lambda_1$ and $\lambda_2$ need amplification prior to their termination at node E, an optical amplifier d may be placed at node D to boost the associated channel powers to a power level suitable for satisfactory detection at node E. When using an optical amplifier such as amp d to overcome transmission losses in a WDM transmission scheme, it becomes necessary to operate the amplifier in a regime where each of the different wavelengths at the amplifier's input experiences sufficient gain. This requirement places restrictions on the maximum allowable composite power and the maximum allowable individual channel power at the amplifier input.

Figure 3:
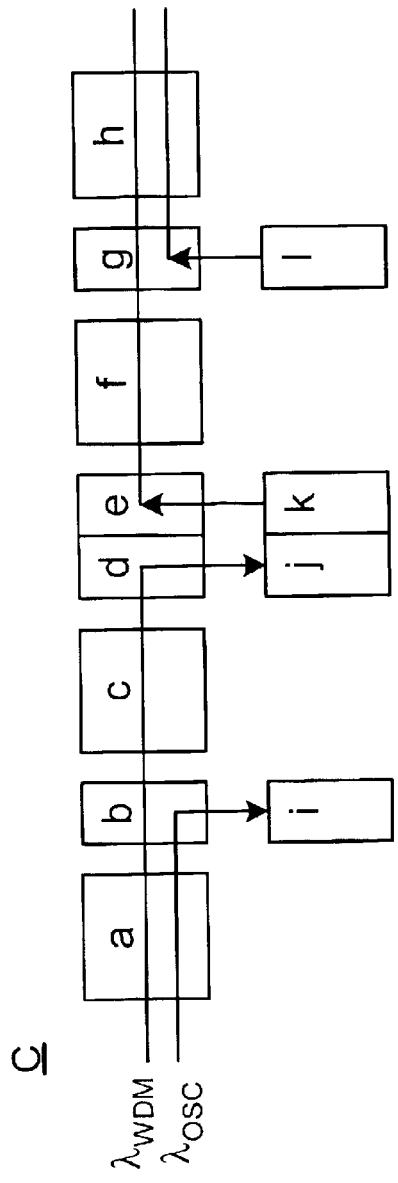
FIG. 3 is a mid-level block diagram of a conventional WDM node illustrating the optical paths taken by the OSC and WDM wavelengths.

FIG. 3 illustrates the internal structure of a conventional node such as node C to further illustrate the context in which the invention may operate. The equipment installed at a node typically includes a sequence of optical components placed in the wavelengths' transmission path. These optical components are identified as follows: (a), (c), (f) and (h) are miscellaneous optical conditioning elements; (b) is an OSC drop filter; (d) is a WDM channel drop filter; (e) is a WDM channel add filter; (g) is a OSC add filter; (i) is an OSC receiver; (j) is a WDM channel receiver; (k) is a WDM channel transmitter with adjustable output power; and (l) is an OSC transmitter.

Typically and as shown in FIG. 3, one filter assembly b drops the OSC and a subsequent filter g adds the OSC. Additional optical components, such as band/wavelength add-drop filters, interleavers, circulators, amplifiers or attenuators may be located either before, after or in between the OSC filters.

Alternatively, a single filter may be used to both drop and add the OSC but a single filter configuration is not preferred. Using separate filters to add and drop the OSC is advantageous because it reduces cross-talk between the added and dropped service channel signals compared to an OSC add/drop configurations utilizing a single filter to both drop and add the OSC. The reason is that filters are not entirely reflective at the OSC wavelength and signal pass-through can result in cross-talk or interference.

In general, the sequence of service channel demultiplexing and detection at each node, as well as launching a new service channel signal continues until the opposite terminal node is reached. As mentioned above each node is typically interconnected by two fibers (optical links), each carrying service channel information in a respective, single direction.

As such and according to the inventive teachings herein, one fiber can serve as a link to establish a fixed synchronization reference between the transmitter and receiver. The second fiber link is the one being characterized for link loss, dispersion and multi-path interference as further explained below in detail.

Alternatively, a single optical fiber may interconnect the nodes as is the case with conventional bi-directional WDM communication systems. In such a case, the single optical fiber may serve as both the first fiber link and the second fiber link.

Figure 4:
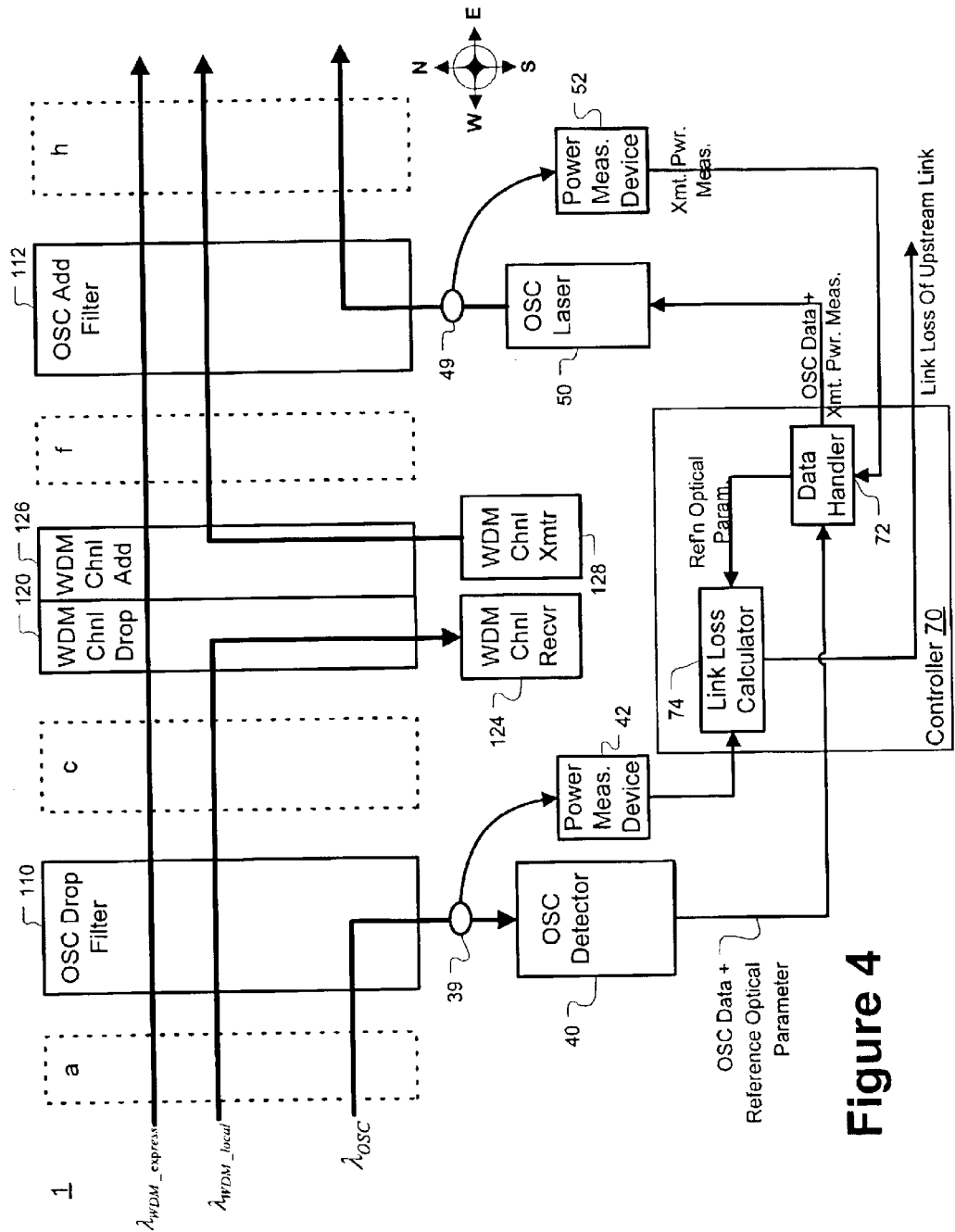
FIG. 4 is a mid-level block diagram of a link loss measuring system according to the invention that utilizes the OSC to measure link losses.

FIG. 4 illustrates a first embodiment of the invention which measures an optical parameter of the OSC, utilizes the OSC to communicate an optical reference parameter, and determines an optical property of the optical link carrying the OSC. In this case, the optical reference parameter includes the OSC transmit power. Also, the measured optical parameter is the optical power of the received OSC. The optical property being determined by the FIG. 4 embodiment is link loss.

FIG. 4 illustrates a first embodiment of the invention in the form of an SCM node 1 that leverages conventional OSC handling structures and functions to advantage and includes inventive addition of components and functions to do so. The inventive SCM node 1 includes conventional service channel structures such as OSC drop filter 110, WDM channel drop filter 120, WDM channel add filter 126, OSC add filter 112, WDM channel receiver 124, WDM channel transmitter 128, and OSC laser 50. If the SCM 1 node is for amplification and not add/drop, then the add/drop hardware (120, 126, 124, 128) may be replaced by conventional amplification devices such as an EDFA (erbium doped fiber amplifier) or equivalent. Other elements such as optical conditioning elements a, c, f and h may or may not be present depending upon the implementation. Some components such as OSC detector 40 have been modified from their conventional structure and function as further explained below.

The node structure 1 shown in FIG. 4 also includes a power measuring device 42 which receives a portion of the light directed to OSC detector 39 via element 39 which may be a tap, coupler or other conventional device. The power measuring device 39 may be constructed with a photodiode. In this way, the invention may measure the optical power of the service channel just received from the upstream optical link. This power measurement may also be performed directly by the OSC detector 40 without the need for a tap 39 or power measuring device 39.

The inventive architecture also includes a power measuring device 52 that receives a portion of the light output by the OSC transmitter laser 50 via element 49 which may be a tap, coupler or other conventional device. The power measuring device 52 may be constructed with a photodiode or may utilize a conventional backfacet diode that is typically included in transmitter lasers such as OSC laser 50. In this way, the invention may measure the transmitted power of the OSC being launched into the downstream optical link.

FIG. 4 also illustrates a controller 70 operatively connected to the OSC detector 40, power measuring device 42, and combiner/modulator 54. The controller 70 may be constructed in a variety of fashions utilizing electronic components, optical components, computer hardware, firmware, software or a combination thereof. Controller 70 may also utilize processing resources of an existing controller such as a network element controller, terminal controller, or network managing controller that already exists in the communication node or system.

The controller 70 includes two main units: a link loss calculator 74 operatively connected to the power measuring device 42 and a data handler 72 operatively connected to the OSC detector 40 and the modulator 54. The data handler 72 and link loss calculator 74 may be a subset of the hardware, firmware, or software of the controller 70 or otherwise utilize the resources of the controller 70. The OSC detector 40 recovers a reference optical parameter and any OSC data that may be carried by the OSC arriving at the OSC detector 40 from an upstream source. The data handler 72 locates and parses the reference optical parameter from the detected OSC which, in this case, is the optical transmit power of the OSC being transmitted from the node upstream of the OSC detector 40. The link loss calculator 74 inputs the received OSC power measurement and the reference optical parameter (upstream OSC transmit power) and calculates a link loss for the upstream optical link. For this purpose the link loss calculator 74 may apply the following equation:

Link Loss (dB)=OSC TX Pwr (dBm)−OSC Add Loss (dB)−Passive Loss (T)(dB)−Passive Loss (R)(dB)−OSC Drop Loss (dB)−OSC RX Pwr (dBm)     (1)

where

OSC TX Pwr is the calibrated output power of the OSC transmitter at one end of the segment (communicated via the OSC as the reference optical parameter and preferably measured in real time)

OSC RX Pwr is the calibrated input power to the OSC receiver at the other end of the segment (measured in real time by power measuring device 42)

OSC Add loss is the power loss associated with the OSC add filter (factory measured and pre-stored by controller 70)

OSC Drop Loss is the calibrated power loss associated with the OSC drop filter (factory measured and pre-stored by controller 70)

Passive Loss (TR) is the calibrated power loss associated with the additional optics at either the transmit/receive node (factory measured and pre-stored by controller 70)

Because the optical link's transmission loss may have a weak wavelength dependency, a correction factor (W) may be applied to the estimated link loss to more accurately determine the segment loss at the WDM channels' wavelengths. This correction factor W may be applied by the link loss calculator 74 of controller 70.

If the quantities in equation (1) are known with a cumulative uncertainty e, then the transmission loss (link loss) of each segment can be estimated with equivalent uncertainty e.

With the inventive apparatus 1 shown in FIG. 4 and described above, it is now possible to calculate the transmission loss between any WDM channel entry point on a node and the input to any downstream node (e.g. an optical amplifier located at a downstream node). If the output power of WDM transmitter 128 is known, it is straightforward to calculate the power associated with the transponder's wavelength at the downstream amplifier's input. Once the channel's power at the amplifier input is known, the channel power may be adjusted by an actuator (e.g., a variable optical attenuator located between the transponder's output and the associated wavelength add filter) so that the input power at that one wavelength matches the desired target value.

In such a manner, the amplifier's input can be groomed to guarantee that each wavelength requiring amplification experiences sufficient gain at the amplifier.

Figure 5:
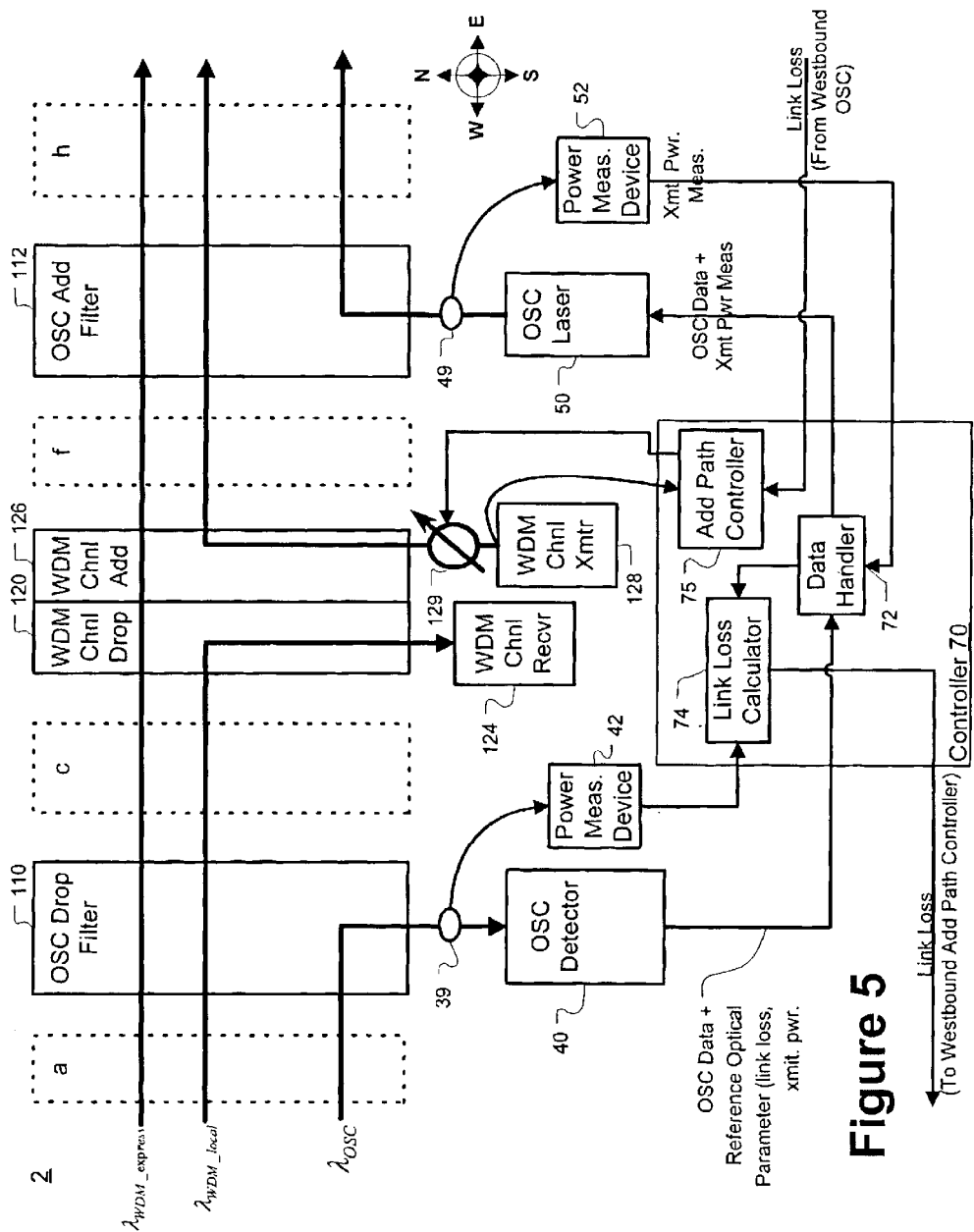
FIG. 5 is a mid-level block diagram of a link loss measuring and channel add path control system according to the invention that utilizes OSCs to measure link losses and transmit add path control signals.

FIG. 5 illustrates this concept in further detail in the form of a node 2 adding one or more wavelength(s). The invention may adjust the add path gain/loss of the wavelength channel(s) being added according to the link loss determined for the optical link into which the channel is being launched. The hardware of node 2 that enables such functionality includes the conventional WDM channel transmitter 128 shown in FIG. 5 that transmits one or more channel(s) of the WDM signal. The WDM channel transmitter 128 is also capable of measuring the optical power of the WDM channel(s) being transmitted via, for example, a backfacet diode included with conventional lasers or a separate power measuring device like those mentioned above. This hardware also includes a variable optical attenuator (VOA) 129 in the optical path of the channel being added. The attenuation of the VOA 129 is adjusted by the add path controller 75.

As alluded to above, the WDM channel transmitter 128 may also represent a plurality of transmitters whose respective channels are combined and then attenuated by VOA 129 such that each channel receives the same attenuation. In another alternative, there may be several distinct WDM channel transmitters 128 each with a respective VOA that is individually controlled by the add path controller 75 according to an aggregate link loss for each channel. Recall that the optical paths of different channels may be quite diverse such that aggregate link loss is different from each channel thus making individual channel power adjustments desirable.

The FIG. 5 embodiment operates as follows. First, the link loss is calculated as described above. For ease of illustration, FIG. 5 shows only the eastbound optical pathway and associated service channel modem. For add path gain/loss control, a bi-directional communication link is required and conveniently available from the bi-directional optical service channel such as the one shown in FIG. 1.

The eastbound OSC provides a reference optical parameter which, in this case, is the power measurement of optical service channel being injected upstream of the node shown in FIG. 5. The FIG. 5 node receives this reference optical parameter, measures an optical parameter (optical power of OSC received), and calculates the link loss of the optical link upstream of the FIG. 5 node. The link loss value is then handed off to the westbound add path controller (see lower right of FIG. 5 showing this linkage) so that its can appropriately adjust the add path gain/loss of the WDM channel being added to the westbound signal. Likewise, the link loss from the westbound OSC is input to the add path controller 75 such that the power of the channel(s) being added to the eastbound channel can be adjusted.

Since the service channel modems have the same structure at each node, one can see this handoff illustrated in FIG. 5 in which the westbound OSC contains the link loss for the optical link downstream of the FIG. 5 node, which link loss is passed to the add path controller 75 to control the power of the channel being launched into the optical link whose link loss has just been determined.

The add path controller 75 also receives the optical power measurement of the WDM channel being transmitted by transmitter 128. With the WDM channel launch power and downstream link loss in hand, the add path controller 75 can adjust the VOA 129 to a target value. Preferably, the adjustment is made such that the channel being added arrives with a desired input power at the first OLA/amplifier (or other node such as an OADM node like node 2) following the add/drop node 2. Link loss is calculated as in eqn (1). Thus, add path controller 75 sets VOA 129 such that WDM Channel Xmtr power−Link Loss−VOA setting=target value, as defined above.

Figure 6:
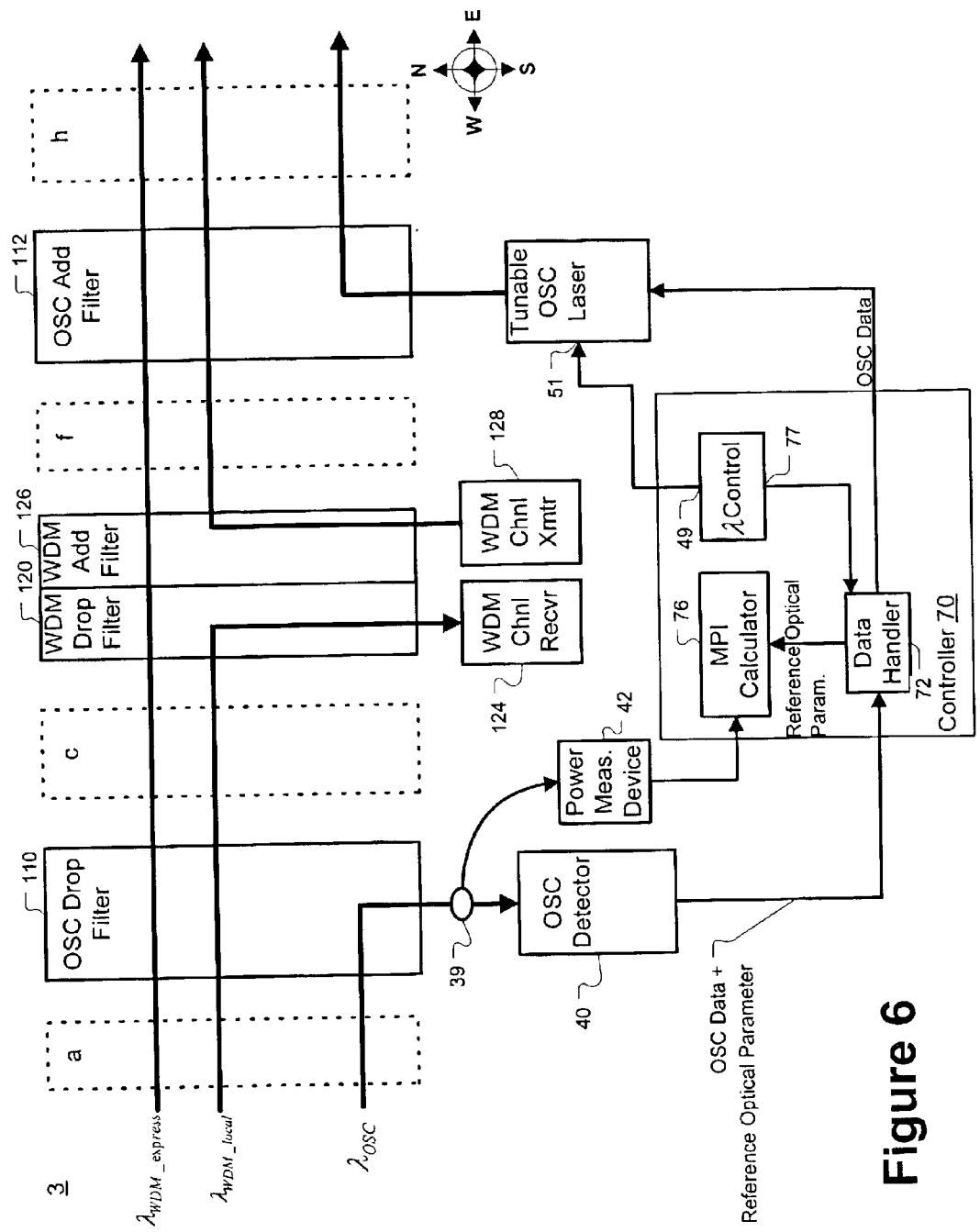
FIG. 6 is a mid-level block diagram of a multi-path interference (MPI) measuring system according to the invention that utilizes the OSC to measure MPI.

FIG. 6 illustrates another embodiment 3 of the invention which measures an optical parameter of the OSC, utilizes the OSC to communicate an optical reference parameter, and determines an optical property of the optical link carrying the OSC. In this case, the optical reference parameter may include a synchronization signal. Also, the measured optical parameter is the optical power of the received OSC. The optical property being determined by the FIG. 6 embodiment is multi-path interference (MPI).

Many of the components and functions of the FIG. 6 embodiment are identical to the FIG. 5 embodiment and descriptions thereof will not be repeated here. The differences include an MPI calculator 76 in place of the link loss calculator 74, a wavelength controller 77, and a tunable OSC laser 51. The tunable OSC laser 51 is preferably a highly coherent source such as a DFB laser to enable accurate MPI calculations. The MPI calculator 76 is operatively connected to the data handler 72 to receive the reference optical parameter (sync signal from an upstream wavelength controller like element 77 in an upstream node). The reference optical parameter input to data handler 72 provides a synchronization reference that is used by MPI calculator to determine when to utilize the received power measurements from power measuring device 42.

The wavelength controller 77 is operatively connected to the tunable OSC laser 51 and sends control signals to the tunable OSC laser 51 to change the OSC wavelength of the OSC being sent downstream. The wavelength controller 77 also informs the downstream node of when the wavelength is being changed via a sync signal via the data handler 72 and OSC laser 51. The OSC data path from OSC detector 40 to data handler 72 to OSC laser 51 permits the OSC data to continue transmission down the optical transmission path from node to node.

As mentioned above, the reference optical parameter is encoded or otherwise included within the OSC. The OSC detector 40 converts the OSC to an electrical signal and outputs the OSC data (if any) plus the reference optical parameter which, in turn, is parsed by data handler 72. The data handler 72 essentially separates the OSC data and reference optical parameter from the electrical OSC output from the OSC detector 40, send the OSC data to the OSC laser 51 from transmission, and sends the optical reference parameter (in this case, a sync signal) to the MPI calculator 76.

The MPI calculator 76 receives the optical reference parameter and the OSC receive power value from the power measuring device 42 and calculates the multi-path interference of the optical link optically coupled to the OSC detector 40. As is known, a multi-path interference level may be calculated by measuring optical signal power fluctuations during a wavelength scan of a coherent optical source. The invention applies this known equation in a unique fashion by utilizing changes of the OSC wavelength, with the MPI calculator 76 which applies the following equation:

$$MPI(dB) = 20\log_{10}\left(\frac{\sqrt{P_{max}} + \sqrt{P_{min}}}{\sqrt{P_{max}} - \sqrt{P_{min}}}\right), \quad (2)$$

where $P_{max}$ is the maximum measured optical power, and $P_{min}$ is the minimum measured optical power. In non-mathematical terms the level of optical power fluctuation is directly proportional to the multi-path interference level and can be used to calculate the MPI level.

Figure 13:
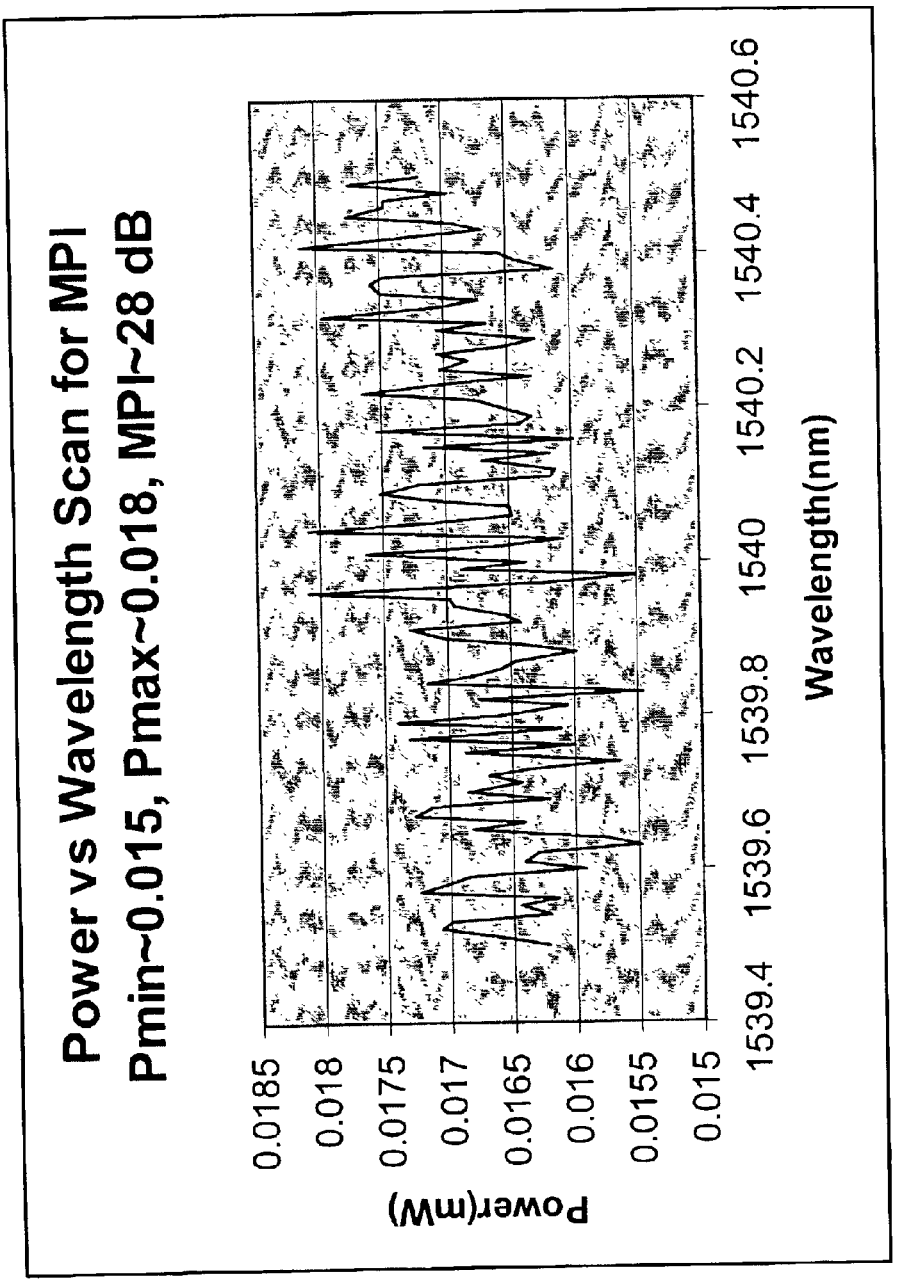
FIG. 13 is a graph of power as a function of wavelength illustrating multi-path interference determinations.

FIG. 13 shows a typical power vs. wavelength scan for a link showing some multi-path interference. Power fluctuations are clearly observable and MPI can be readily computed.

Figure 7:
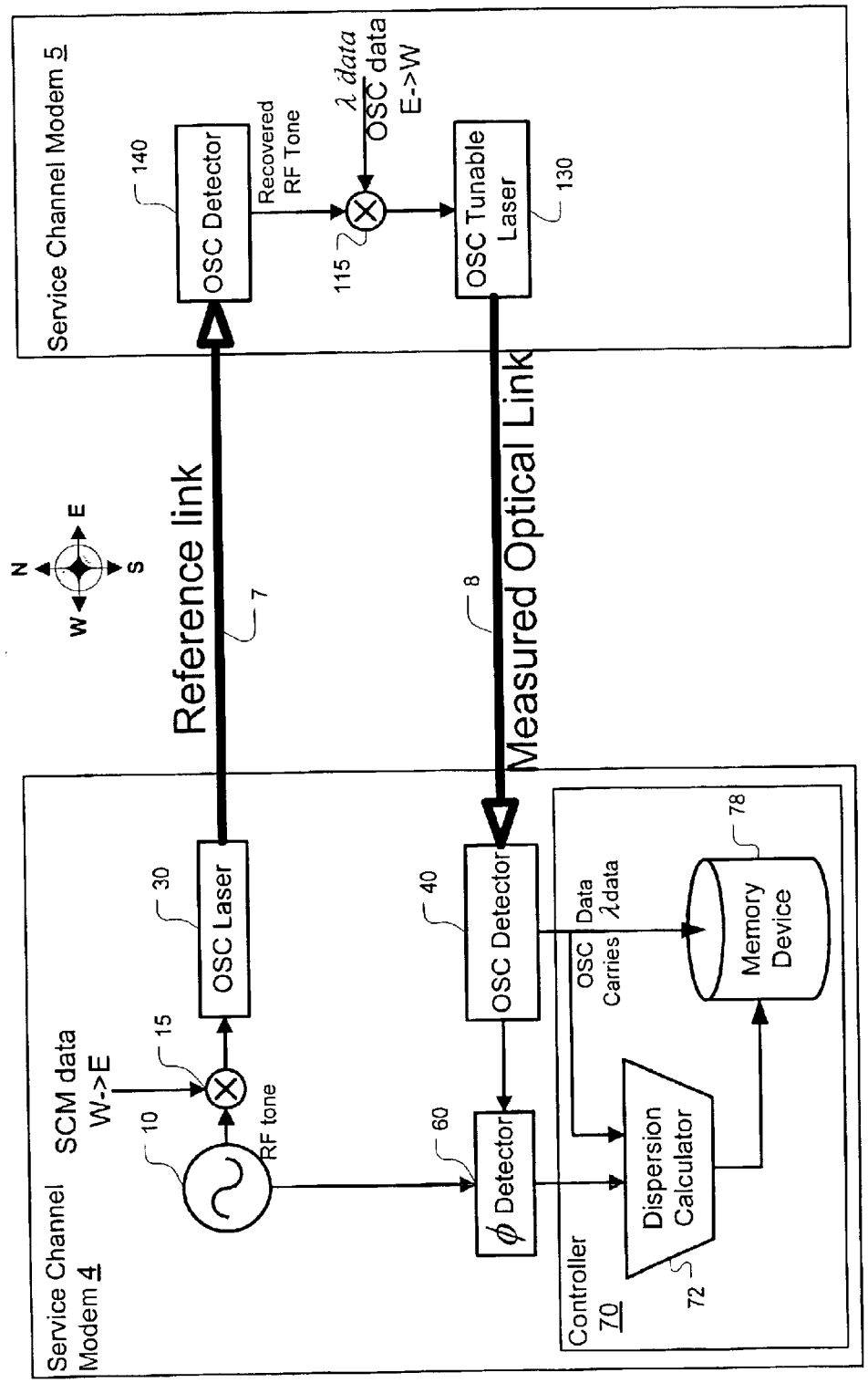
FIG. 7 is a mid-level block diagram of a chromatic dispersion measuring system according to the invention that utilizes OSCs to measure chromatic dispersion of a link.

FIG. 7 illustrates another embodiment of the invention which measures an optical parameter of the OSC, utilizes the OSC to communicate an optical reference parameter, and determines an optical property of the optical link carrying the OSC. In this case, the optical reference parameter includes a synchronization reference and, optionally, wavelength data as further explained below. Also, the measured optical parameter is the phase of the signal transported via OSC. The optical property being determined by the FIG. 7 embodiment is chromatic dispersion.

Generally speaking, there are several ways in which service channel modems may be adapted to dispersion measurements according to the invention. These possible approaches for encoding the information on the transmit side are enumerated below:

1. A high-frequency RF tone can be added on top of the service channel baseband data on the transmit side. The receive side detects the phase of the tone. See FIGS. 7, 8, 9 and 10 and further explained below in detail.
2. If the service channel data rate is sufficiently high, data timing contained in its clock signal can be used for phase-sensitive detection. See FIG. 11 and further explained below in detail.

Dispersion is measured by mapping out the relationship between the optical wavelength and the phase delay.

Figure 8:
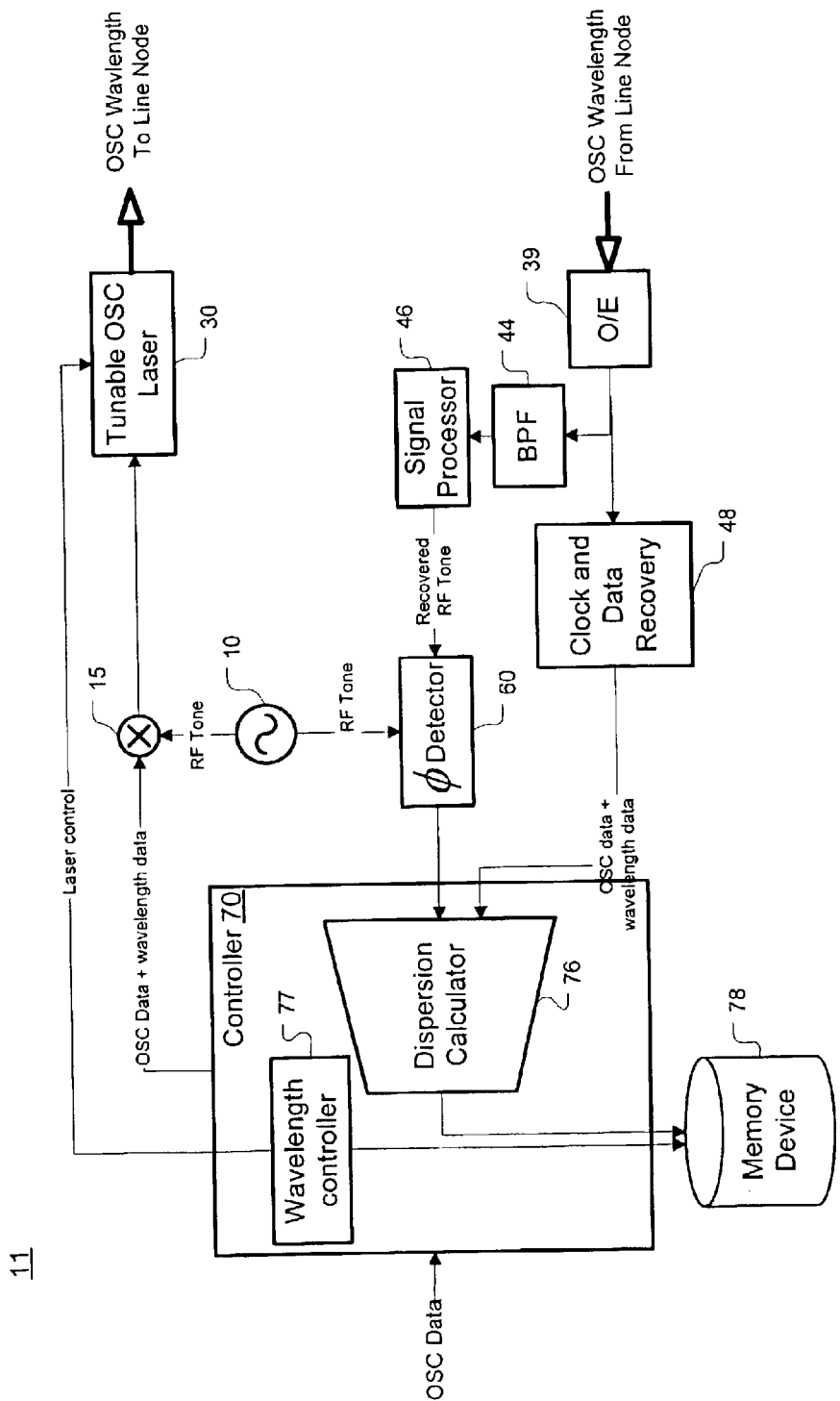
FIG. 8 is a mid-level block diagram of an alternative chromatic dispersion measuring system according to the invention that utilizes OSCs to measure chromatic dispersion of a link.

1. If the OSC laser 30 is a narrow-band (i.e DFB-type), then laser wavelength tuning is used to establish a mapping between the OSC wavelength and the corresponding signal phase delay information. This is shown in FIGS. 7–10. The information on the specific wavelength setting may be passed from the OSC transmitter to the OSC receiver via the service channel data path as further explained below in relation to FIGS. 7–10
2. Alternatively, a spectrally broad optical source (i.e. FP laser or an LED) can be used. In this case, the wavelength scanning capability would be provided by a tunable optical filter on the receive side as illustrated in FIG. 9b. In this case, the receiver has local information available on both the wavelength as well as the phase delay.

More specifically and as shown in FIG. 7 the inventive apparatus for measuring chromatic dispersion uses a reference optical link 7 and a measured optical link 8 which is essentially a new role or new use for the conventional W-E fiber and E-W fiber interconnecting the nodes. As mentioned above, some DWDM systems bi-directionally communicate over a single optical fiber. In such a case, the single optical fiber may serve as both the reference optical link 7 and the measured optical link 8.

As further shown in FIG. 7, an oscillator 10 generates an RF tone that is combined with the W-E OSC data by combiner/modulator 15 and used to modulate the OSC laser 30. In this way, the OSC is encoded with the RF tone and transmitted from the first node (including SCM 4) to the second node (including SCM 5). The OSC detector 140 detects the OSC from SCM 4, converts the OSC to an electrical signal and recovers the RF tone. The recovered RF tone is combined with the E-W OSC data and wavelength data by combiner/modulator 115 and used to modulate the OSC tunable laser 130. The wavelength data includes data specifying at least a first and a second OSC wavelength output from OSC tunable laser 130 and is sent to the dispersion calculator 72 and, optionally, the memory device 78.

The OSC launched into optical link 8 by laser 130 is received by OSC detector 40. As will be explained in more detail below in reference to a particular implementation, the OSC detector 40 converts the OSC received from optical link 8, converts it to an electrical signal and recovers the RF tone. Actually, the original RF tone from oscillator 10 has already been recovered by OSC detector 140 in the east service channel modem 5 and used to modulate the OSC sent from east SCM 2 to the west SCM 4. Thus, OSC detector 40 is actually recovering a recovered RF tone. In other words the OSC detector 40 re-recovers the RF tone and passes it along to the phase detector 60 and, optionally, the memory device 78.

The phase detector 60 is operatively connected to the oscillator 10 and to the OSC detector 40, and respectively receives the RF tone and re-recovered RF tone. By detecting the delay between the RF tone and re-recovered RF tone, the phase detector 60 is able to detect the phase of the OSC. The phase detector may be constructed with, for example, an RF analog mixer, a multiplier circuit, or a digital signal processor operating on digitized signals.

A dispersion calculator 72 receives the phase shift value from phase detector 60. Dispersion calculator 72 may be a software or electronic module in the controller 70 capable of performing the following calculation.

$$D = \frac{\Delta \phi}{2\pi f \Delta \lambda}$$

where

D is the chromatic dispersion of the measured optical link 8, $\Delta\phi$ is the phase shift value from the phase detector 60, f is the reference frequency (the frequency of the RF tone), and $\Delta\lambda$ is the wavelength shift (the difference between the first and second OSC wavelengths).

FIG. 7 best illustrates the general theory and operation of the invention for measuring chromatic dispersion. FIG. 8 provides further details of the implementation. Specifically, FIG. 8 illustrates a particular construction of a service channel modem 11 consistent with the invention. Some of the elements are common with the elements shown in FIG. 7 as indicated by like reference numbers.

A particular construction of the OSC detector 40 is shown in FIG. 8 and includes O/E (optical-to-electrical converter which may be a conventional photodiode or other photodetector that converts the optical service channel to an electrical signal) 39 receiving the OSC wavelength from a line node, a band-pass filter (BPF) 44 operatively connected to the O/E 39, a signal processor 46 operatively connected to the BPF 44, and a clock and data recovery (CDR) circuit 48 operatively connected to the O/E 39.

The BPF 44 is a conventional filter whose pass band is centered around the RF tone frequency such that the RF tone is passed but other frequencies are substantially rejected. The signal processor 46 may be either digital or analog and implemented using conventional components. The signal processor 46 functions to condition the signal for input to the phase detector, as for example, by optionally amplifying the analog signal to a level required by an analog phase detector, and/or digitizing the signal as would be required by a digital phase detector. The CDR 48 is also a conventional circuit that recovers the clock and data signals from the OSC and retimes the data for possible further transmission.

FIG. 8 also illustrates a wavelength controller 77 which may be implemented in software or with an electronic circuit much like the controller 70 itself. The wavelength controller 77 is operatively connected to the tunable OSC laser 30 so that it may send control signals to the tunable OSC laser 30 to change the OSC wavelength.

The wavelength controller 77 also supplies wavelength data to the modulator/combiner 15 so that the downstream node will be informed of the OSC wavelength being transmitted, and thereby permit calculation of the chromatic dispersion by the invention. In other words, each time the wavelength controller 77 sends a control signal to the tunable OSC laser 30 to change the OSC wavelength the wavelength controller 77 also informs a downstream node, via the OSC, of the new OSC wavelength setting. In this way, the OSC wavelength can be swept over a plurality of values and the downstream node may map phase and wavelength for the chromatic dispersion calculation.

Figure 9A:
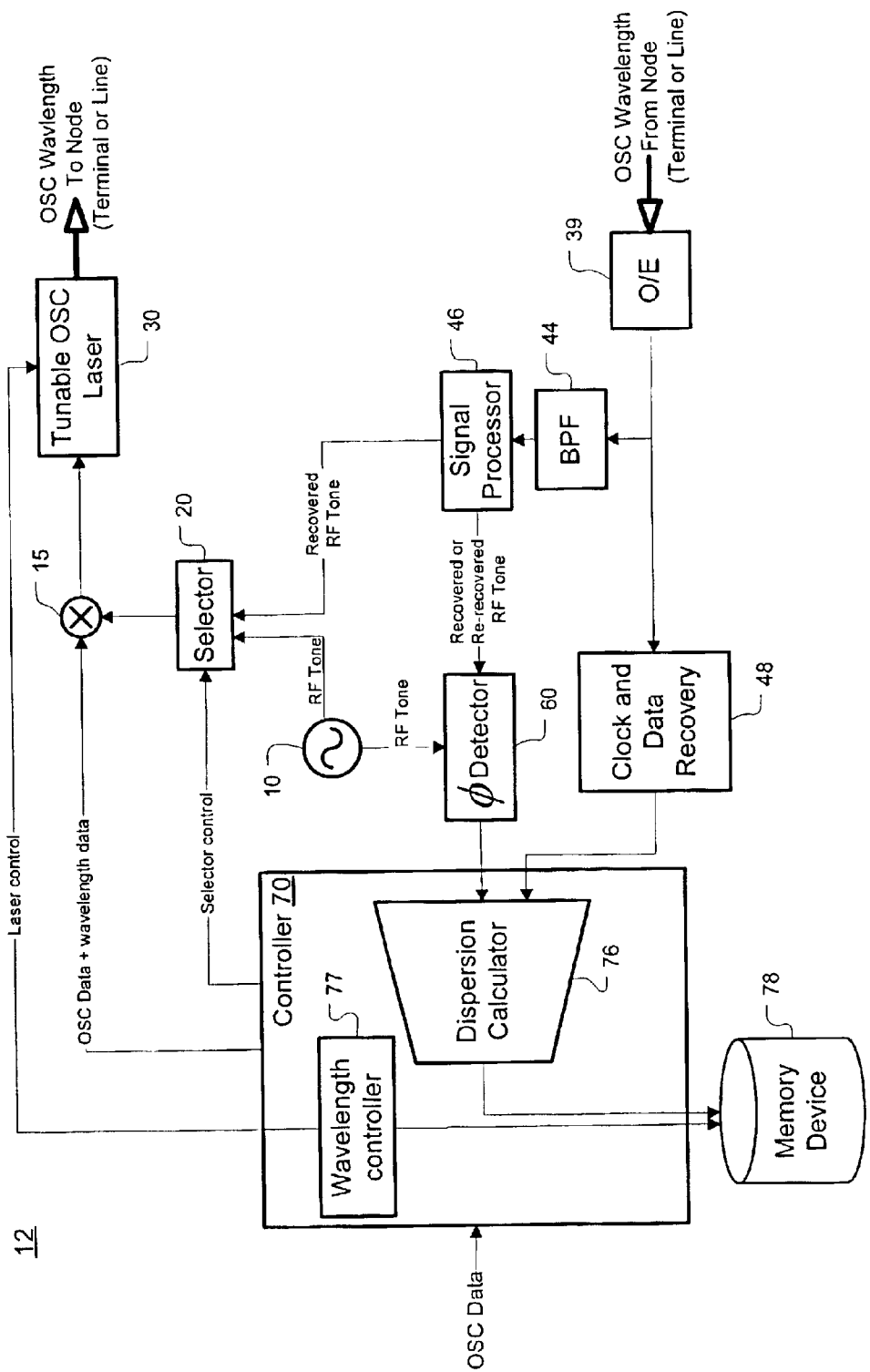
FIG. 9a is a mid-level block diagram of another alternative chromatic dispersion measuring system according to the invention that utilizes OSCs and a tunable OSC laser to measure chromatic dispersion of a link.
Figure 9B:
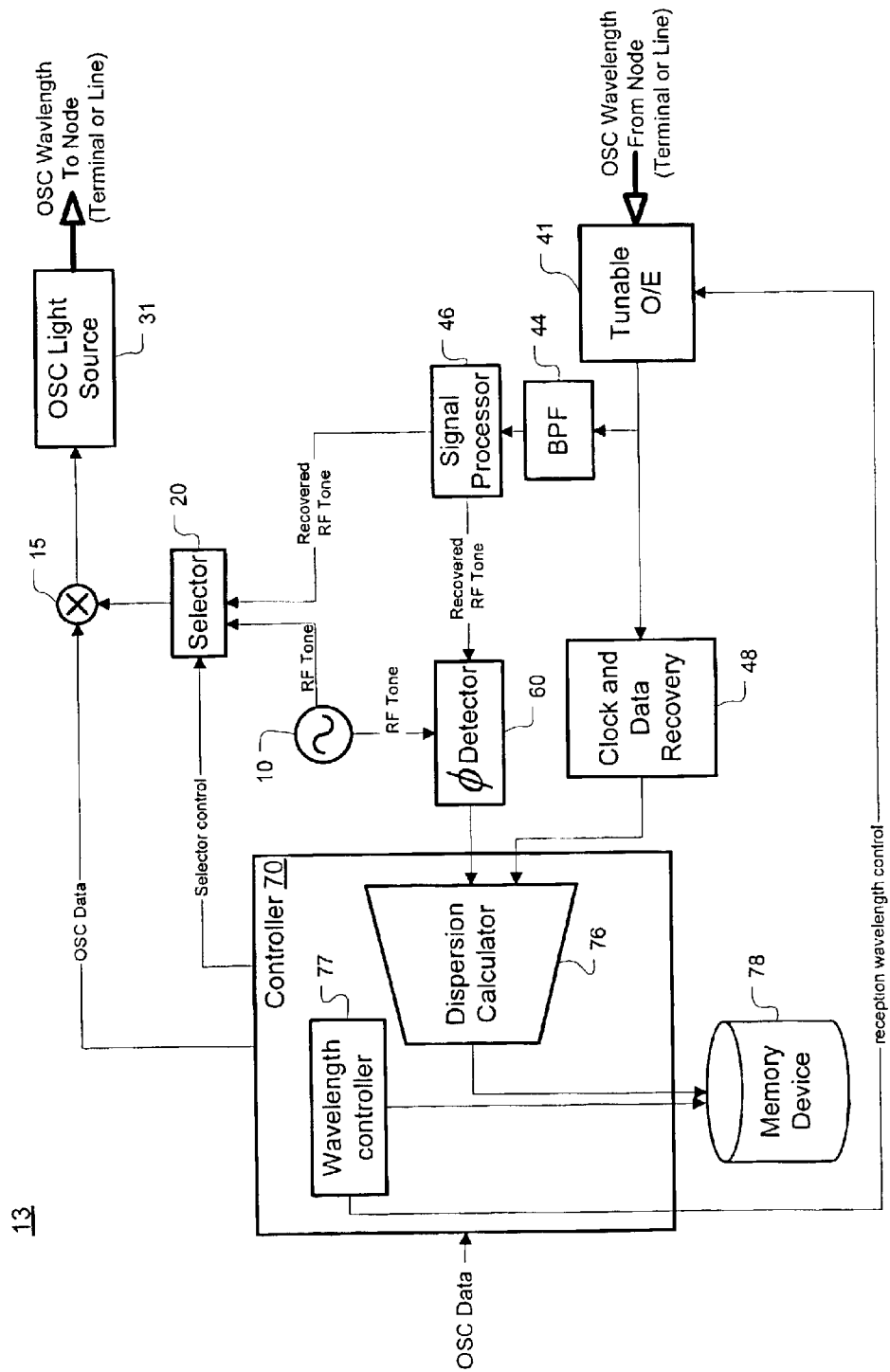
FIG. 9b is a mid-level block diagram of another yet alternative chromatic dispersion measuring system according to the invention that utilizes OSCs and a tunable receiver to measure chromatic dispersion of a link.

FIG. 9a illustrates another particular construction of a service channel modem 12 according to the invention. Some of the elements are common with the elements shown in FIG. 8 as indicated by like reference numbers. The main difference between these figures is that FIG. 9a adds a selector 20 which has inputs operatively connected to the oscillator 10, signal processor 46, and controller 70 and an output operatively connected to the combiner/modulator 15. The selector 20 permits the service channel modem to function on both sides of the measured optical link 8 (or reference link 7). In other words, the FIG. 9a service channel modem may act as either the origination node (e.g. the west SCM 4 in FIG. 7) or the relay node (e.g. the east SCM 5 in FIG. 7).

More specifically, the selector 20 is commanded by the controller 70 to select between the RF tone from the oscillator 10 and the recovered RF tone from the signal processor 46. When the service channel modem 12 begins the measurement process, the RF tone from oscillator 10 is added to the OSC by combiner/modulator 15 and the selector 20 routes the RF tone accordingly. On the other hand, when the OSC with RF tone is received by the FIG. 9a service channel modem, the O/E 39, BPF 44 and signal processor 46 recover the RF tone to produce a recovered RF tone. To continue the measurement process, this recovered RF tone is used to modulate the OSC being sent back to the originating SCM: the selector 20 routes the recovered RF tone to the combiner/modulator 15 such that the OSC being sent over the measure optical link 8 includes the recovered RF tone. Thus, the selector switches which of the RF tones (original from oscillator 10 or recovered from signal processor 46) is used to modulate the OSC laser 30. In this way, the SCM of FIG. 9a can act either as the origination node of the RF tone or as the relay node where the RF tone is recovered and sent back to the origination node.

FIG. 9b illustrates yet another particular construction of a service channel modem 13 according to the invention. Some of the elements are common with the elements shown in FIG. 9a as indicated by like reference numbers. The main difference between these figures is that FIG. 9b SCM 13 tunes the receiver element rather than the transmitter element to provide a frequency sweep. More specifically, SCM 13 utilizes a tunable receiver (tunable O/E 41) instead of a tunable OSC laser 30 as in SCM 12. Furthermore, the OSC light source 31 used by the SCM 13 is not tunable but does generate a broad spectrum of light. The OSC light source 31 may be constructed with, for example, an FP laser, an LED or an ASE source that is preferably capable of generating light having a spectrum encompassing the wavelengths to be measured. The tunable O/E 41 may be constructed with, for example, a convention O/E converter and a tunable filter that filters the light being received by the O/E converter per a command signal from the wavelength controller 77.

During the measurement process, the service channel modem 13 sweeps the wavelength being measured by controlling the reception wavelength. More specifically, the wavelength controller 77 commands the tunable O/E 41 to receive a series of particular wavelengths such as by stepping through a series of wavelengths from short to long or vice versa. The wavelength value being tuned by the tunable O/E 41 is also fed by the wavelength controller 77 to the memory device 78 for future calculations such as MPI and chromatic dispersion as explained below.

Figure 10:
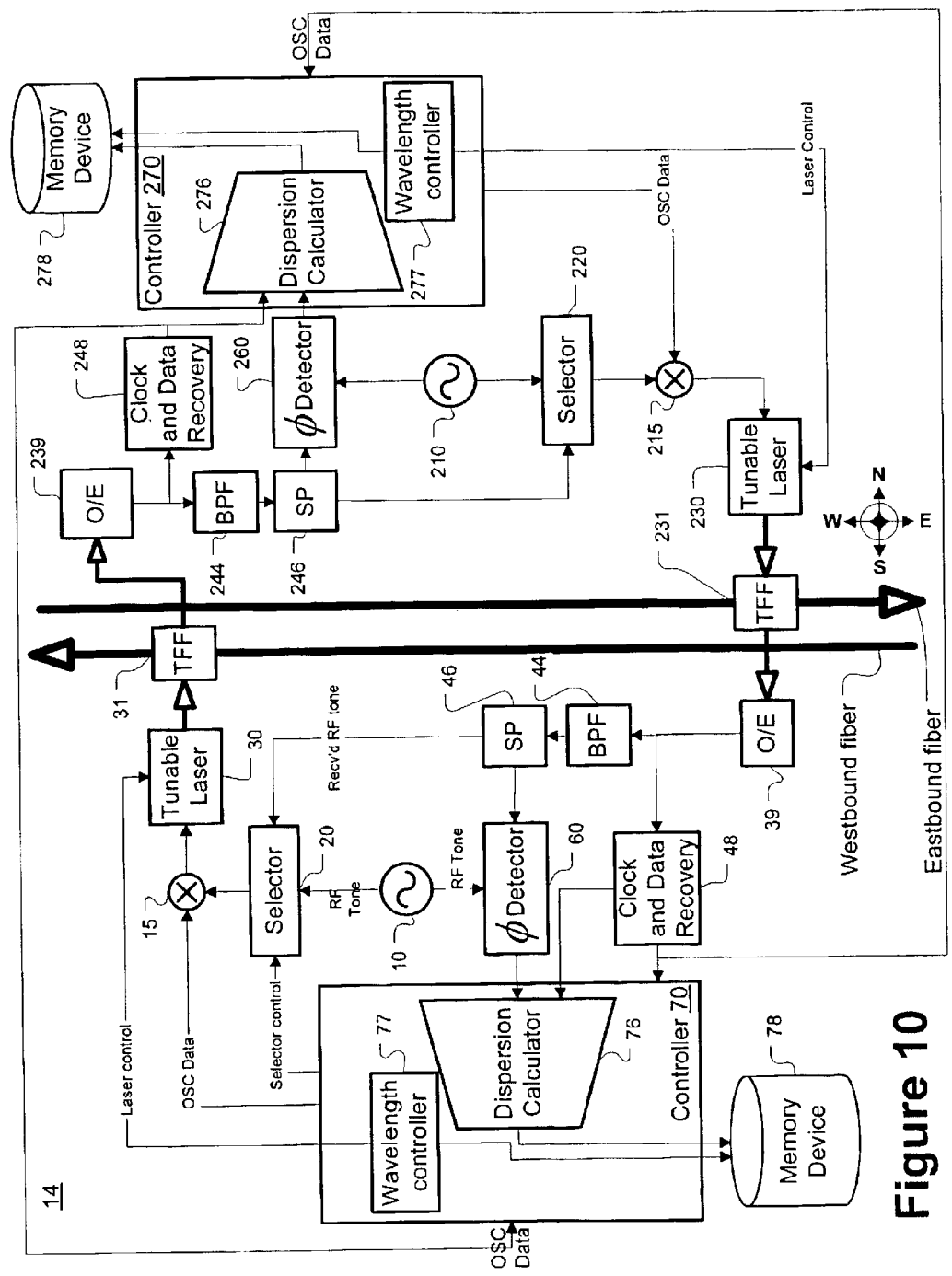
FIG. 10 is a mid-level block diagram of a bi-directional chromatic dispersion measuring system according to the invention that utilizes OSCs to measure chromatic dispersion of links.

FIG. 10 illustrates an SCM 14 in accordance with the invention that is able to handle OSCs on both the westbound fiber and eastbound fiber. Essentially, the FIG. 9 SCM 14 structure is mirrored such that each of the fibers (westbound and eastbound) has an associated SCM structure. The SCM structure serving the eastbound fiber has the same structure as the SCM structure service the westbound fiber and includes O/E 240, BPF 244, signal processor 246, phase detector 260, CDR 248, oscillator 210, combiner/modulator 215, selector 220, tunable laser 230, controller 270, dispersion calculator 276, and wavelength controller 277 that are similar to structure and arrangement of like-named components of FIG. 9.

FIG. 10 also illustrates filters for adding/dropping the OSCs. Specifically, TFF (thin film filter) 31 adds the westbound OSC and drops the eastbound OSC while TFF 231 adds the eastbound OSC and drops the westbound OSC. As mentioned above, using a single filter for both adding and dropping is not preferred and is being shown here largely for ease of illustration. It is preferable to use a separate filter for adding and dropping and with both the east and westbound OSCs being handled by the FIG. 10 SCM 14. This means that a total of four OSC filters would be used in the preferred embodiment.

FIG. 10 also shows a data path from controller 70 to controller 270 that is intended to illustrate the conventional flow of OSC data from node to node in a downstream direction. In other words, the eastbound OSC is dropped (TFF 231), detected (O/E 39) and recovered (CDR 48) to produce the OSC data. To continue downstream, the OSC data is handed off to controller 270 via the illustrated data path so that it may be encoded and added to the eastbound OSC via combiner/modulator 215, laser 230, and TFF 231. A similar datapath exists for the westbound OSC data as further illustrated in FIG. 10.

The controllers 70, 270 shown in FIG. 10 may be combined into a single controller or utilize the resources of a single piece of hardware such as a CPU. Indeed, the controllers 70, 270 may be implemented with software that shares a common hardware host and such an implementation is preferred because it is less expensive and less complex. Likewise, the memory devices 78 and 278 may be a single memory device.

Figure 11:
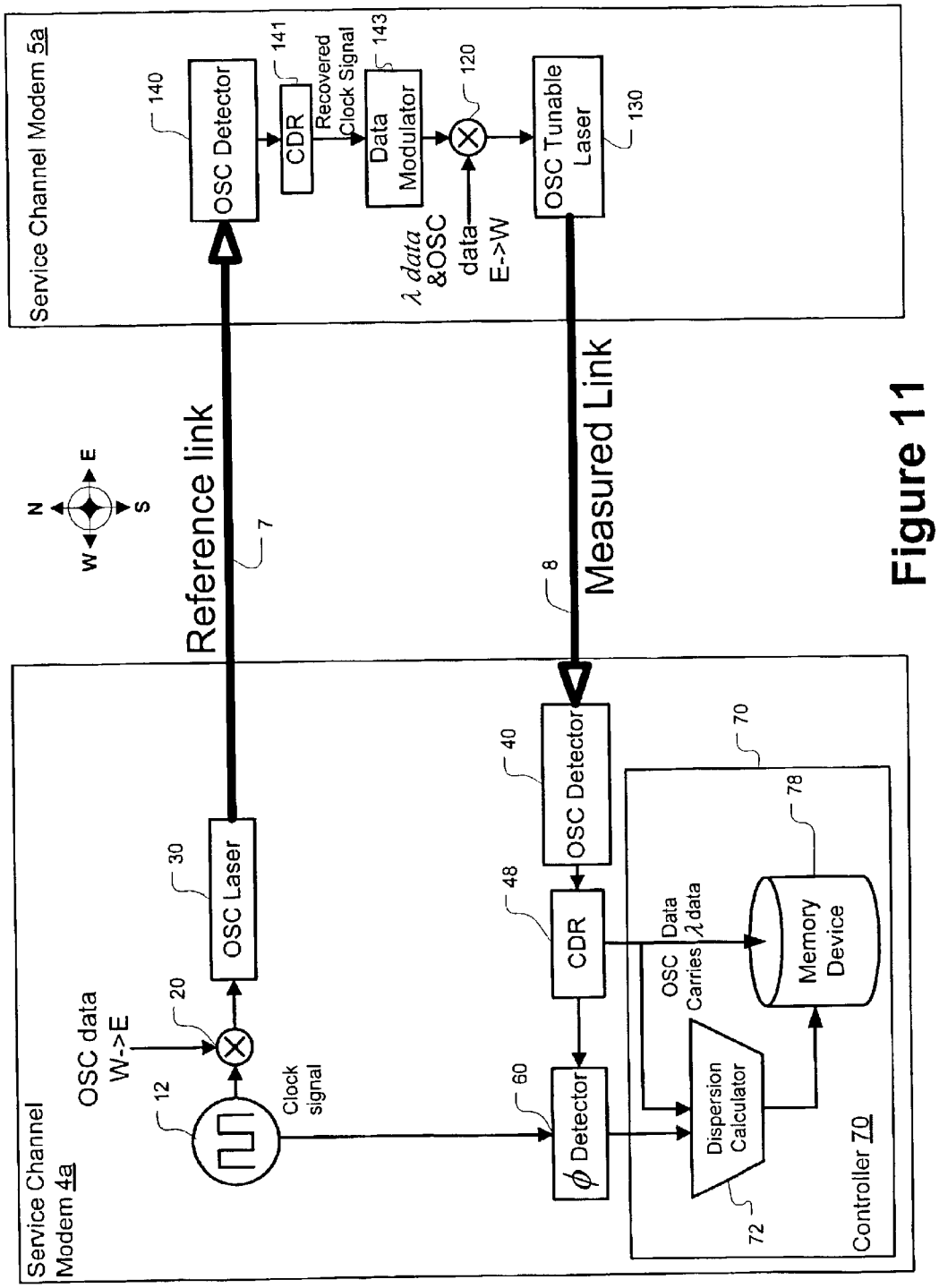
FIG. 11 is a mid-level block diagram of another alternative chromatic dispersion measuring system according to the invention that utilizes OSCs and a clock signal to measure chromatic dispersion of a link.

FIG. 11 illustrates another alternative construction of the invention including SCM4a and SCM5a. Specifically, a clock signal may be used in place of the oscillator 10 generating the RF tone (e.g. as sown in FIG. 7) particularly if the OSC data rate is high enough for the desired measurement resolution. Service channels typically carry information at much lower rates than actual data signals. Typical service channel rates are in the range of 1 to 100 Mbits/second, which may be sufficient depending upon the application and desired accuracy.

As shown in FIG. 11 a clock signal generator 12 supplies a clock signal that is used to clock the OSC data being sent over the reference optical link 7. This clock signal is recovered by the CDR 141 which itself is a conventional circuit like CDR 48 in the embodiments discussed above. The recovered clock signal is then used to clock the E-W OSC data being sent over the measured optical link 8. Upon receipt from the measured link 8, the OSC is detected by detector 40 and the recovered clock signal is again recovered to produce a re-recovered clock signal via CDR 48. The re-recovered clock signal serves as the value of f in the chromatic dispersion calculation discussed above. Otherwise, the FIG. 11 embodiment is structurally and functionally similar to the embodiment shown in FIG. 7.

Figure 12:
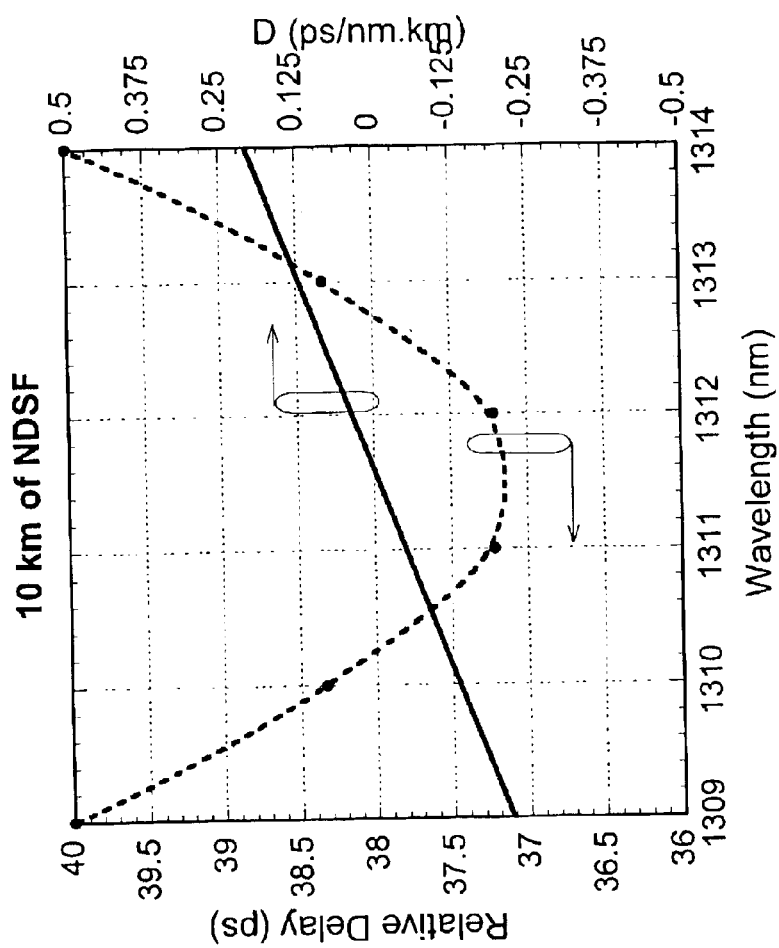
FIG. 12 is a graph of delay (ps) versus wavelength (mn) illustrating determinations of chromatic dispersion.

FIG. 12 is a graph showing a typical group-delay and dispersion measurement as would be obtained by the invention on a link of ~10 km non-dispersion-shifter fiber (Corning SMF-28 in this particular example), using a nominal 1310 nm laser for the OSC laser that was tuned over 5 nm.

Figure 14:
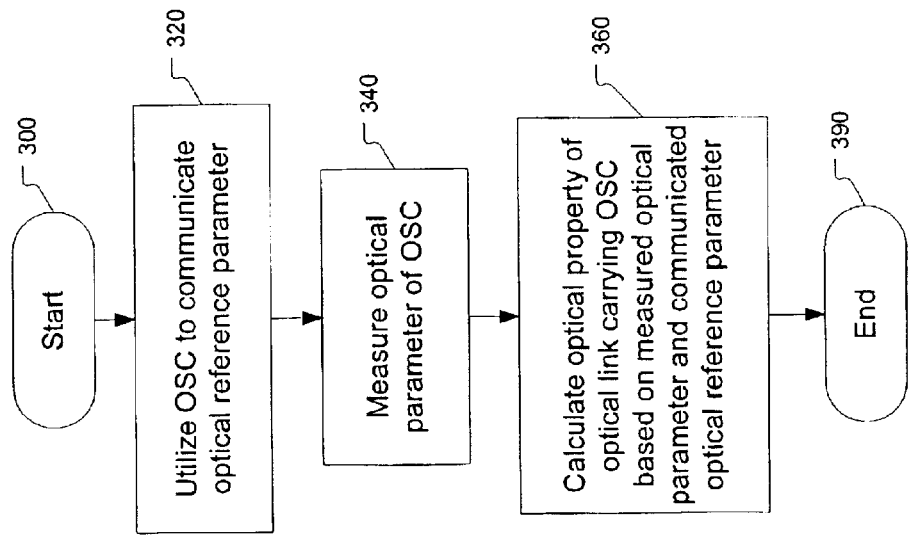
FIG. 14 is a high-level flowchart illustrating the inventive method of determining optical properties.

FIG. 14 is a high-level flowchart of the inventive methodology, and also serves as a tool to recap inventive concepts. After starting (300) the process, the invention utilizes (320) the OSC to communicate an optical reference parameter. The optical reference parameter may be the OSC transmit power that is being sent to a downstream node for link loss or MPI determinations. The optical reference parameter may also be an RF tone, clock signal or other oscillating signal. The optical reference parameter may also include the wavelength value of the current OSC wavelength being transmitted particularly if wavelength scanning is required to determine the particular optical property in question such as chromatic dispersion. The techniques for utilizing (320) the OSC to communicate the optical reference parameter include adding the oscillatory signal to baseband OSC data, timing the OSC data with the oscillatory signal, and encoding the optical reference parameter (e.g. OSC transmit power, wavelength, etc) in the OSC data using standard data encoding techniques.

In the case of measuring chromatic dispersion, utilizing (320) the OSC to communicate the optical reference parameter may further include a relay of the optical reference parameter back to the originating node. As discussed in relation to FIGS. 7 and 11 above the oscillatory signal (RF tone or clock signal) is received by a downstream node (e.g. east node as shown), recovered, and then used to communicate an OSC back to the originating node (e.g. west node as shown) and including the recovered optical reference parameter.

The inventive method proceeds by measuring (340) an optical parameter of the OSC. The optical parameter being measured may include the OSC receive power in the case of link loss and MPI determinations. The optical parameter being measured also includes the OSC phase in the case of chromatic dispersion determinations.

The invention may then calculate (360) an optical property of the optical link carrying the OSC based on the reference optical parameter and the measured optical parameter. The reference optical parameter is the one communicated via the OSC in the utilization (320) step described above and the measure optical parameter is the one measured (340) as described above. This calculation (360) essentially determines a value for the optical property of interest which includes link loss, multi-path interference, and chromatic dispersion. Thus, the method is done (390) as further indicated in FIG. 14.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An apparatus for using an optical service channel to determine an optical property of an optical link connecting a first node and second node of an optical communications system, comprising:

a laser optically coupled to the optical link, said laser being modulated by a signal to generate the optical service channel being launched into the optical link, wherein the signal includes a reference optical parameter;

an optical service channel detector optically coupled to the optical link, said optical service channel detector detecting the optical service channel and recovering the reference optical parameter from the detected optical service channel;

said optical service channel detector also measuring an optical parameter of the optical service channel to generate a measured optical parameter; and a controller operatively connected to said optical service channel detector, said controller calculating an optical property of the optical link based on the recovered reference optical parameter and the measured optical parameter.

2. An apparatus for using an optical service channel to determine an optical property of an optical link according to claim 1, wherein the optical property of the optical link is multi-path interference of the optical link, the recovered reference optical parameter is a synchronization signal and the measured optical parameter is a received optical power of the optical service channel being received by said optical service channel detector, said optical service channel detector measuring the received optical power of the optical service channel at a plurality of different optical service channel wavelengths;

wherein the measured optical parameter is the received optical power measurement of the optical service channel at the plurality of different optical service channel wavelengths, said controller controlling said laser to change the optical service channel wavelength to the plurality of different optical service channel wavelengths; and said controller calculating the multi-path interference of the optical link based on the received optical power obtained at a plurality of optical service channel wavelengths and the recovered reference optical parameter.

3. An apparatus for using an optical service channel to determine an optical property of an optical link according to claim 1, wherein the optical property of the optical link is link loss of the optical link, the apparatus further comprising:

a transmit optical power measuring device optically coupled to the optical link and measuring the transmit optical power of the optical service channel being transmitted by said laser;

wherein the reference optical parameter carried by the optical service channel is the transmitted optical power measurement of the optical service channel measured by said transmit optical power measuring device, said optical service channel detector measuring the received optical power of the optical service channel being received by said optical service channel detector;

wherein the measured optical parameter is the received optical power measurement of the optical service channel; and said controller calculating the link loss of the optical link based on the transmitted optical power and the received optical power.

4. An apparatus for using an optical service channel to determine an optical property of an optical link according to claim 3, said controller calculating link loss according to Link Loss (dB)=transmitted optical power−OSC Add Loss−Passive Loss (T)−Passive Loss (R)−OSC Drop Loss (dB)−received optical power+wavelength correction (W)

where the OSC Add Loss, the OSC Drop Loss, the Passive Loss (T), and the Passive Loss (R) are constants, and wavelength correction (W) accounts for a wavelength-dependent loss.

5. An apparatus for using an optical service channel to determine an optical property of an optical link according to claim 1, wherein the optical link includes a reference optical link linking the first node to the second node and a measured optical link linking the second node to the first node, wherein the optical property is of the measured optical link and is chromatic dispersion;

said laser including a first laser at the first node optically coupled to the reference optical link and a second laser at the second node optically coupled to the measured optical link, said first laser being modulated by the signal to generate the optical service channel being launched into the reference optical link;

said optical service channel detector including a first optical service channel detector at the first node optically coupled to the measured optical link and a second optical service channel detector at the second node optically coupled to the reference optical link;

the apparatus further comprising:

an oscillator operatively connected to said measuring device and to said first laser, said oscillator generating an RF tone, wherein the signal modulating said first laser includes the RF tone generated by said oscillator;

said second optical service channel detector detecting the optical service channel received from the reference optical link and recovering the RF tone to produce a recovered RF tone;

said second laser being modulated by a second signal to generate the optical service channel being launched into the measured optical link, wherein the second signal modulating said second laser includes the recovered RF tone recovered by said second optical service channel detector;

said first optical service channel detector detecting the optical service channel received from the measured optical link and recovering the recovered RF tone to produce a re-recovered RF tone;

a phase detector operatively coupled to the measured optical link via said first optical service channel detector, said phase detector detecting a phase delay of the optical service channel received from the measured optical link based on relative phases of the re-recovered RF tone from said first optical service channel detector and the RF tone from said oscillator; and said controller including a dispersion calculator operatively connected to said phase detector, said dispersion calculator calculating the chromatic dispersion of the measured optical link based on the phase delay of the optical service channel received from the measured optical link.

6. An apparatus for using an optical service channel to determine an optical property of an optical link according to claim 5,
said controller controlling said second laser to tune a wavelength of the optical service channel being launched into the measured optical link to a plurality of different wavelengths;
said second laser being modulated by the second signal to generate the optical service channel being launched into the measured optical link,
wherein the second signal modulating said second laser includes the recovered RF tone recovered by said second optical service channel detector and wavelength data indicative of the plurality of different wavelengths;
said dispersion calculator calculating the chromatic dispersion of the measured optical link based on the phase delay and wavelength data of the optical service channel received from the measured optical link.

7. An apparatus for using an optical service channel to determine an optical property of an optical link according to claim 6, wherein the plurality of different wavelengths includes at least a first and a second OSC wavelength,
said dispersion calculator calculating the chromatic dispersion, D, according to $$D = \frac{\Delta\phi}{2\pi f \Delta\lambda}$$

where
$\Delta\phi$ is the phase delay from said phase detector,
f is the frequency of the RF tone, and
$\Delta\lambda$ is a wavelength shift determined according to a difference between the first and second OSC wavelengths.

8. An apparatus for using an optical service channel to determine an optical property of an optical link according to claim 1, further comprising:
a measuring device optically coupled to the optical link and distinct from said optical service channel detector, wherein said measuring device and not said optical service channel detector measures the optical parameter of the optical service channel.

9. A system for measuring chromatic dispersion, comprising:
a west service channel modem including an oscillator generating an RF tone;
a west laser operatively connected to said RF oscillator, said west laser being modulated by a west signal to generate an eastbound optical service channel being launched into the west-east optical link, wherein the west signal modulating said west laser includes the RF tone generated by said oscillator;
an east service channel modem including
an east detector converting the eastbound optical supervisory channel to an electrical signal and recovering the RF tone to produce a recovered RF tone; and
a tunable east laser operatively connected to said east detector, said tunable east laser being modulated by an east signal to generate a westbound optical supervisory channel being launched into a east-west optical link;
said tunable east laser tuning a center wavelength of the westbound optical service channel to at least two different wavelengths,
said west SCM further including a west detector converting the westbound optical supervisory channel to an electrical signal and recovering the recovered RF tone to produce a re-recovered RF tone;
a phase detector operatively connected to said west detector and to said RF oscillator, said phase detector detecting a phase difference between the RF tone from said RF oscillator and the re-recovered RF tone from said west detector; and
a dispersion calculator operatively connected to said west detector, said dispersion calculator calculating a chromatic dispersion value for the east-west optical link based on the phase difference detected by said phase detector and wavelength data representing the at least two different wavelengths.

10. The system for measuring chromatic dispersion according to claim 9,
wherein the east signal includes wavelength data representing the at least two different wavelengths;
said west detector also recovering the wavelength data to produce recovered wavelength data;
said dispersion calculator calculating the chromatic dispersion value for the east-west optical link based on the phase difference detected by said phase detector and the recovered wavelength data.

11. A method of determining an optical property of an optical link in a wavelength division multiplexed (WDM) optical system having a plurality of nodes and an optical supervisory channel between adjacent nodes including a first node and a second node interconnected by the optical link capable of carrying a WDM signal and the optical supervisory channel, the method comprising:
utilizing the optical supervisory channel to communicate a first optical reference parameter between the first and second nodes;
measuring an optical parameter of the optical supervisory channel received by the second node to generate a measured optical parameter; and
calculating an optical property of the optical link interconnecting the first and second nodes based on the first optical reference parameter and on the measured optical parameter.

12. The method of determining an optical property of an optical link according to claim 11,
wherein the optical property includes link loss, multi-path interference, or chromatic dispersion.

13. The method of determining an optical property of an optical link according to claim 11,
wherein the optical link includes a measured optical link linking the first node to the second node and a reference optical link linking the second node to the first node,
wherein the optical property of the measured optical link is chromatic dispersion.

14. The method of determining an optical property of an optical link according to claim 13,
said utilizing step including:
generating an RF tone at the second node;
modulating a laser at the second node with the generated RF tone to transmit the optical service channel from the second node to the first node via the reference optical link;
receiving the optical service channel with the RF tone at the first node;
recovering the RF tone from the received optical service channel to produced a recovered RF tone;
modulating a laser at the first node with the recovered RF tone to transmit the optical service channel from the first node to the second node via the measured optical link;

changing a wavelength of the optical service channel from a first wavelength to a second wavelength; and retransmitting the optical service channel into the measured optical link at the second wavelength to retransmit the optical service channel with the recovered RF tone from the first node to the second node; and receiving the optical service channel with the recovered RF tone at the second node; and recovering the recovered RF tone from the received optical service channel to produced are recovered RF tone;

said measuring step including measuring a phase of the re-recovered RF tone from the detected optical service channel with respect to the RF tone generated by said generating step, and said calculating step calculating chromatic dispersion of the measured optical link based on the and values of the first and second wavelengths.

15. The method of determining an optical property of an optical link according to claim 14, said calculating step calculating the chromatic dispersion, D, according to $$D = \frac{\Delta\phi}{2\pi f \Delta\lambda}$$

where $\Delta\phi$ is the phase of the re-recovered RF tone, f is the frequency of the RF tone, and $\Delta\lambda$ is a wavelength shift determined according to a difference between the first and second wavelengths.

16. The method of determining an optical property of an optical link according to claim 13, said utilizing step further including:

encoding the values of the first and second wavelengths into optical service channel data of the optical service channel being transmitted from the first to the second nodes;

recovering the values of the first and second wavelengths from the detected optical service channel;

said calculating step calculating chromatic the measured optical link based on the detected phase and recovered values of the first and second wavelengths.

17. The method of determining an optical property of an optical link according to claim 16, said changing, encoding, retransmitting and recovering steps being iterated N times;

said calculating step calculating chromatic dispersion of the measured optical link based on the detected phase and recovered values of the N wavelengths.

18. The method of determining an optical property of an optical link according to claim 11, wherein the optical property of the optical link is multi-path interference, said utilizing step including:

transmitting the optical service channel from the first node to the second node via the optical link;

changing a wavelength of the optical service channel from a first wavelength to a second wavelength; and measuring an optical power of the optical service channel being received by the second node to produce an optical service channel received power value;

said calculating step calculating multi-path interference of the optical link based on the optical service channel receive power values at the first and second wavelengths.

19. The method of determining an optical property of an optical link according to claim 18, said calculating step calculating the multi-path interference (MPI) according to:

$$MPI(dB) = 20\log_{10}\left(\frac{\sqrt{P_{max}} + \sqrt{P_{min}}}{\sqrt{P_{max}} - \sqrt{P_{min}}}\right),$$

where Pmax is a maximum measured optical power, and Pmin is a minimum measured optical power measured by said measuring step.

20. The method of determining an optical property of an optical link according to claim 11, wherein the optical property of the optical link is optical link loss, said utilizing step including:

transmitting the optical service channel from the first node to the second node via the optical link;

measuring an optical power of the optical service channel being transmitted to produce an optical service channel transmit power value;

encoding values of the first and second wavelengths and the optical service channel transmit power value into optical service channel data of the optical service channel being transmitted from the first node to the second node receiving the optical service channel with the encoded optical service channel transmit power value at the second node; and recovering the optical service channel transmit power value;

said measuring step measuring an optical power of the optical service channel being received by the second node to produce an optical service channel received power value; and said calculating step calculating optical link loss of the optical link based on the optical service channel transmit power value and the optical service channel receive power value.

21. The method of determining an optical property of an optical link according to claim 20, further comprising:

utilizing the optical supervisory channel to communicate the optical link loss from the second node to an upstream node upstream of the second node;

detecting the optical supervisory channel at the upstream node;

recovering the optical link loss from the detected optical supervisory channel; and adjusting an add path gain of at least one channel being added to the WDM signal upstream of the second node based on the recovered optical link loss.

* * * * *